United States Patent [19]

Karlsson

[11] Patent Number: 4,508,422

[45] Date of Patent: Apr. 2, 1985

[54] OPTICAL SCANNING SYSTEM

[75] Inventor: Lars Karlsson, Täby, Sweden

[73] Assignee: Pharos AB, Lidingo, Sweden

[21] Appl. No.: 471,843

[22] Filed: Mar. 3, 1983

[30] Foreign Application Priority Data

Mar. 3, 1982 [SE] Sweden .................... 8201306

[51] Int. Cl.³ ................... G02B 27/17; H04N 3/08
[52] U.S. Cl. .................... 350/6.8; 250/236; 358/206
[58] Field of Search ........... 350/6.8, 6.7, 6.6, 6.5; 250/235, 236; 358/206

[56] References Cited

U.S. PATENT DOCUMENTS 4,215,912  8/1980  Minoura ...................... 350/6.8
4,230,394 10/1980  Brueggemann et al. ........... 350/6.8

FOREIGN PATENT DOCUMENTS 2550815  5/1977  Fed. Rep. of Germany ....... 350/6.5
3022365  5/1981  Fed. Rep. of Germany ....... 350/6.8

OTHER PUBLICATIONS

W. L. Wolfe and G. L. Zissis, "The Infrared Handbook", Paragraph 9.4 (1978).

Primary Examiner—Jon W. Henry
Attorney, Agent, or Firm—Larson and Taylor

[57] ABSTRACT

A scanning system for optical scanning of a scene in at least one dimension has a multi-faceted reflective scanning rotor as the scanning element. In order to have a high scanning efficiency a so-called facet-tracing is provided such that the beam path is reflected by first and second areas of reflection on the rotor, both areas being disposed in a non-collimated beam path. An optical beam converging means is disposed in the beam path between the scene and the rotor for forming a primary image of the scene between the beam converging means and the rotor. A substantially spherical mirror is disposed in the beam path of the system between the first and the second areas of reflection. A radiation detector is disposed at the end of the beam path. A beam converging optical element, such as a positive lens or a substantially spherical mirror, is disposed in the beam path between the first substantially spherical mirror and the second area of reflection. Means are provided to form a real image of the radiation detector in the beam path at a position between the first substantially spherical mirror and a location so close to the beam converging optical element that the element serves as a field element for this location of the real image.

18 Claims, 12 Drawing Figures

OPTICAL SCANNING SYSTEM

BACKGROUND OF THE INVENTION

Field of the Invention

This invention relates to an optical scanning system, which makes an optical scanning in at least one dimension and which includes a multi-faceted reflective rotor. The invention is applicable both to line or one-dimensional scanning and to simultaneous horizontal and vertical or two-dimensional scanning, such as for picture generation.

In use of the invention, a scene or object is rapidly scanned along a line by a scanning system including a rotor positioned in the path of the scanning beam of radiation and having a plurality of contiguous reflective facets arranged as a polygon around the periphery of the rotor. The scanning beam of radiation from the sensed area of the scene is directed through the scanning system to one or more radiation detectors. During each scan the scene is progressively sensed along a horizontal line and the output from the radiation detector therefore is a video signal suitable for representation on a CRT-monitor. For each change of facet in the beam path the scan is repeated. This provides horizontal scanning (scanning in a first dimension). As is well known in the art, simultaneous vertical scanning (scanning in a second dimension) may be effected by an oscillating mirror or some other type of scanning element turning at a lower rate than the polygonal rotor and located at a substantially stationary pupil.

However, this scanning system is suitable not only for radiation detecting purposes but also for picture generation. In the case of picture generation, a rapidly changeable, modulated light source, such as a light emitting diode (LED) or a laser, takes the place of the radiation detector in a scanning system for radiation detection, and the beam path through the scanning system is reversed with respect to the beam path of a radiation detection system.

Also, it is within the scope of the invention to use the same rotor simultaneously for radiation detection purposes and for picture generation purposes. In this case it is possible to use the same optical components and the same multi-faceted rotor for both purposes by inserting beam splitting devices at the input and the output of the scanning system. It is also possible to use different facets on the same rotor but to double the rest of the optical components necessary for the two purposes. In both cases the signal from the radiation detector is used for modulating the light intensity of the rapidly changeable light source.

In the optical scanning systems having a scanning element in the form of a multi-faceted reflective rotor the change-over from one facet to another causes radiation coming from two directions to impinge onto the detector simultaneously, or, in the case of picture generation, two beams to impinge on different portions of the picture simultaneously. In the past, in order to keep the rotor reasonably small the number of facets around the periphery of the rotor therefore had to be restricted to produce an acceptable scanning efficiency, i.e., to produce an acceptable ratio of the length of the part of the scan giving a useful representation of the object to the total length of the scan.

A predetermined horizontal scan frequency is often desired in order that the scanning may be TV-compatible. The greater the number of the facets around the periphery of the rotor can be chosen, the lower the speed of the rotor can be set. Low rotor speed means reduced power consumption and increased service life. Therefore, efforts have been made to increase the scanning efficiency and at the same time increase the number of facets.

One example of such a system is shown in U.S. Pat. No. 4,030,806. In this system, radiation from a laser passes a first positive lens to be focused on the multifaceted rotor. Because the facets are plane, focusing exactly on the facets can only be accomplished at two angular positions of the rotor for each facet, preferably chosen such that the exact focusing occurs when the beam is reflected by a facet near the transitions between two facets. A second positive lens is disposed in the beam path after the area of reflection by the facet to collimate the beam. Plane mirrors disposed outside the rotor then guide the beam onto the rotor a second time and in such a way that the beam is moved in synchronism with the rotor. Although the beam directed to the rotor is focused exactly on the facet only for two angular rotor positions, focus of the beam is very close to the facet throughout the scan, every little irregularity or scratch in the facet will greatly affect the path of the reflected beam. Moreover, the reflected beam takes varying paths between the two positive lenses so that the collimation of the reflected beam is exact only for two angular positions of the rotor for each facet. It has been suggested to eliminate this problem by disposing spherical or cylindrical reflectors outside the rotor to direct the beam onto the rotor the second time. A device of this kind is shown in German published patent application No. DE-A-3 022 365. This device includes a rotor having two axially contiguous sets of facets around the rotor, one set of which has convexely curved facets. Since the beam is focused on the curved facet surfaces of the rotor, scratches and irregularities greatly affect the beam path. Besides, the manufacture of a rotor having such facets is difficult and therefore expensive. The most troublesome problem connected with the manufacture of a rotor having convexely curved reflective facets is the checking measurement to which each manufactured rotor has to be subjected. This checking measurement is practically impossible to make without the aid of special equipment because the transitions between the facets are not as well defined as in the case of plane facets. It is to be noted that even a very small variation of the back focal length of the facets affects the scanning result and that, therefore, the rotor must have very small manufacturing tolerances.

SUMMARY OF THE INVENTION

In view of the foregoing, the main object of this invention is to provide an improved electro-optical scanning system, which has a high scanning efficiency, a high resolution of scanning, which has a multi-faceted rotor easy to manufacture and to check, and which is less sensitive to scratches and irregularities in the rotor surfaces.

To this end, the optical scanning system of the present invention comprises the features of construction and arrangement of elements set forth in the claims.

ON THE DRAWINGS

Other objects and features of the invention will become apparent from the following description taken in connection with the accompanying drawings, in which.

AS SHOWN IN THE DRAWINGS

Figure 1:
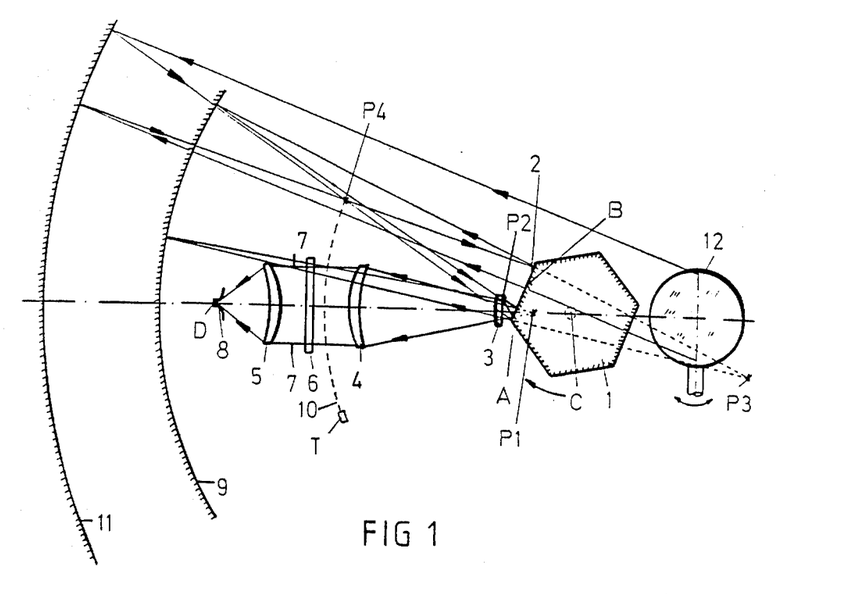
FIG. 1 is a plan view of a first embodiment of the scanning system according to the invention.
Figure 2:
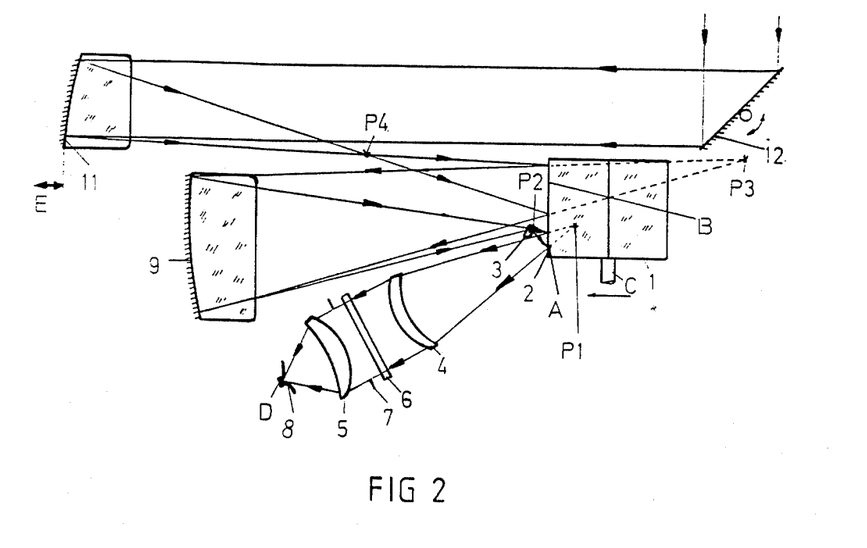
FIG. 2 is a side elevational view, partly in section, of the system shown in FIG. 1.

In the embodiment shown in FIGS. 1 and 2 a rotor 1 rotatably driven about an axis C by a motor (not shown) has plane, reflective facets 2 disposed adjacent to each other around its periphery. Only six facets 2 are shown in FIG. 1 in order that the illustration may be perspicuous; in practice, the number of facets is substantially greater. In FIG. 2, which for illustrative purposes shows the rotor in a different rotational position, the facets are shown as being parallel to the axis C of the rotor, i.e., the facets define the circumferential surface of a regular polygonal cylinder. Alternatively, the facets may include an angle with the rotor axis C.

As is best seen in FIG. 2, a positive lens 3 is disposed in front of the lower part of the rotor 1 near the facets 2. An image P1 of a radiation detector D is formed by an optical relay system which in this embodiment includes two positive lenses 4 and 5. The beam of radiation is collimated between the lenses 4 and 5, between which an optical filter 6, which limits the wavelength region of the radiation incident on the detector, and an aperture stop 7, which determines the aperture of the entire system are disposed. As usual, a cooled baffle 8 is disposed at the detector D.

The lens 3 is a field lens, and the stationary image P1 is a virtual mirror image of a real image P2, which is situated within or near the lens 3 and which, owing to the reflection at A of the beam on one of the facets 2, moves along a curved line within or closely along the lens during the rotation of the rotor. It is to be noted that it is the aperture stop 7 in the optical relay system 4 and 5 that delimits the beam of radiation from the object or scene reaching the detector D. Therefore, the function of the device is best understood if the beam path is followed from the detector D towards the scene or object, even if the radiation is oppositely directed.

Because the lens 3 is a field lens, it bends the radiation cone without changing its apex angle. A substantially spherical mirror 9 is disposed outside the rotor 1 to bring the radiation back to the rotor 1. The lens 3 bends the beam path such that the beam brought back to the rotor by the mirror 9 follows each facet at such an angular rate that the entire beam is reflected the second time by the upper part of the same facet 2 during the useful part of the scan.

Behind the facets the mirror 9 forms a virtual image P3 of the image P2. Since during a scan the image P2 travels along a curved line located within or near the lens 3, the image P3 as well travels along a curved line in the space. The radius and the center of curvature of the mirror 9 are chosen such in relation to the rotor that the reflection at B on the upper part of the facet 2 is circumferentially centered on the facet in this part throughout the scan. Owing to the reflection at B, the image P3 is a virtual mirror image of a real image P4 located in the space outside the rotor. As the rotor rotates, the image P4 moves along a curved line 10, which approximately is a circular arc concave to the rotor. A substantially spherical mirror 11 is disposed such that the line 10 as closely as possible lies on its focusing surface and serves as the objective of the scanning system.

An oscillating mirror 12 is placed at the stationary pupil generated by the horizontal scanning system. The mirror 12 effects vertical scanning.

A temperature reference T may be disposed at one end of the curved line 10 so that the beam impinges upon it at the beginning of the scan, for example. A second temperature reference (not shown) may be disposed at the other end of the curved line. When two temperature references are used, they may have different temperatures and cooperate to provide both a temperature level reference and a response reference. Preferably, the temperature references are disposed at the ends of the well defined region of the line 10 where rays do not come from two different directions.

In FIGS. 1 and 2 the radiation between the scanned object and the mirror 11 is shown to be collimated. This is the situation when the object is located far away from the system. When the object is close to the scanning system, distance adjustment is effected by moving the mirror 11 in the direction indicated by the arrow E in FIG. 2. The two mirrors 9 and 11 need not be perfectly spherical. To reduce the astigmatism which is due to the fact that the radiation impinges on the mirrors at an angle to their optical axes, as is apparent from FIG. 2 for example, both or one of the mirrors may be toroid mirrors or ellipsoidal mirrors.

Basically, the lens 3 serves two purposes. Firstly, by virtue of its focal distance in conjunction with the focal distance and location of the mirror 9 the lens 3 ensures that the beam when reflected at B on the rotor follows and fills up the width of the facet 2 and that no radiation from any facet other than the one actually effecting the scan comes into the beam path to the detector. Secondly, the lens 3 contributes to the curvature of field in such a way that the image P4 will move along a curved line which is concave to the rotor, namely the aforementioned line 10, so that a substantially spherical mirror 11 may be used as an objective. The lens 3 may be either spherical or cylindrical.

Since the image P2 is placed in or very near the field lens 3, the beam will have a certain width when reflected at A on the facet 2 resulting in a minor loss of scanning efficiency. However, this loss is in the practical case quite small and even when having many facets (in the order of 20) on the rotor, a scan efficiency of 80 to 90% is easy to achieve.

Figure 3:
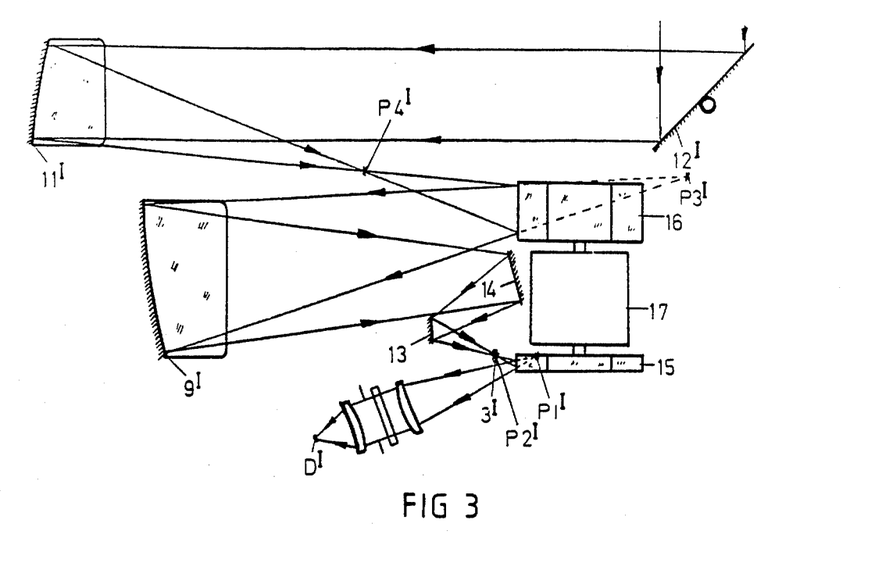
FIG. 3 is a side elevational view, partly in section, of a second embodiment.

If the magnification of the image P2 in the image P3 is kept low, preferably not much higher than 1, as is the case in the embodiment shown in FIG. 3, the realization of the desired curvature of the line 10 is facilitated.

FIG. 3 shows a scanning system in which the beam path between the lens $3^I$ and the mirror $9^I$ has been extended by insertion of two plane mirrors 13 and 14 in the beam path between the image $P2^I$ and the mirror $9^I$ to fold the beam. It is not necessary to have a single multi-faceted rotor on which the beam is reflected twice on the same facet. As shown in FIG. 3, two multi-faceted rotors 15 and 16 may be used. The two rotors are placed on different sides of a driving motor 17. In the figure the rotors are shown to have the same diameter, but this is not necessary. Moreover, the rotors need not have the same rotational speed or rotational direction, because these quantities may be the same or different, depending on the dimensions and positions of the lens $3^I$ and the mirror $9^I$ in relation to the two rotors.

In the embodiment shown in FIG. 3 an oscillating mirror $12^I$ effects the vertical scanning. However, vertical scanning may also be effected by having the facets on the rotor 16 inclined to the axis of the rotor at an angle which varies from one facet to the next. This is true also for the embodiments shown in the other figures.

Figure 4:
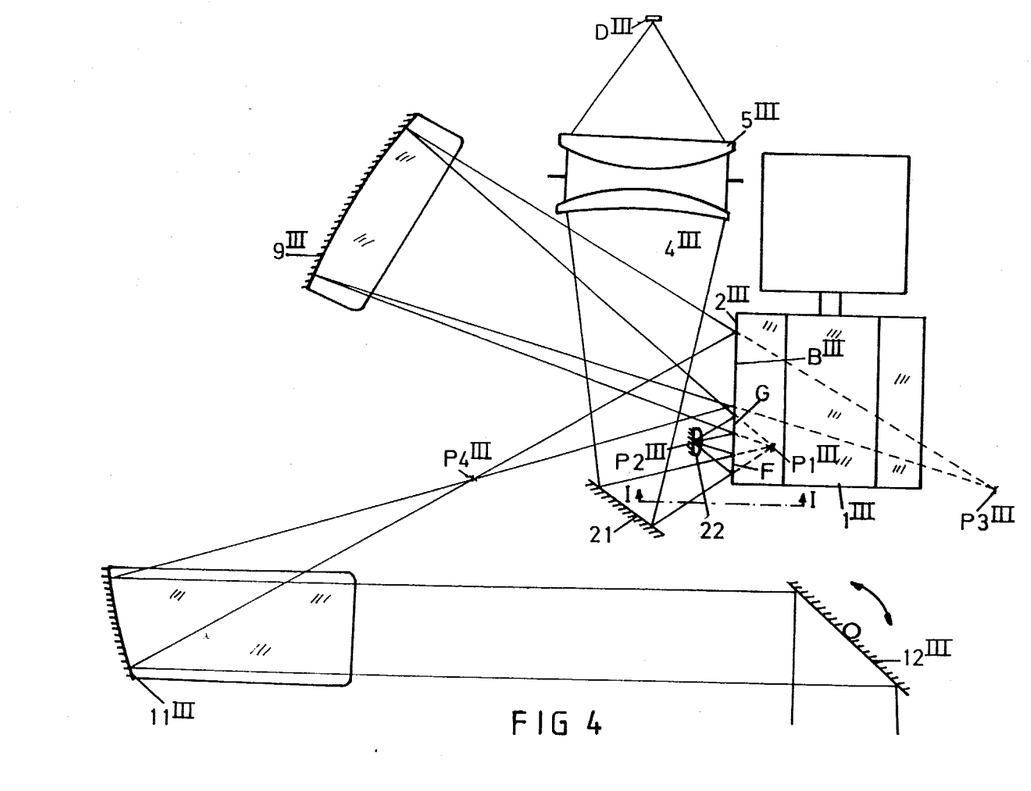
FIG. 4 is a side elevational view, partly in section, of a third embodiment.

A third embodiment of the device according to the invention is shown in FIG. 4. The detector $D^{III}$ with the associated optical relay system $4^{III}$, $5^{III}$ is positioned with the optical axis substantially parallel to the axis of the rotor $1^{III}$. A plane mirror 21 defects the beam path towards a facet $2^{III}$ on the rotor, such that a stationary image $P1^{III}$ of the detector $D^{III}$ is formed behind the facet. In front of the rotor $1^{III}$ a lens 22 is disposed. On the side facing away from the rotor the lens 22 has a reflective coating. The stationary image $P1^{III}$ is a virtual mirror image of a real image $P2^{III}$ located in the lens 22 on or near the reflective coating and moving within the lens 22 during the rotation of the rotor as a consequence of the reflection of the beam on the facet at F. The beam is reflected back to the facet $2^{III}$ by the reflective coating and is again reflected on the facet at G. A further image is formed behind the facet $2^{III}$ at approximately the same place as the image $P1^{III}$.

Figure 5:
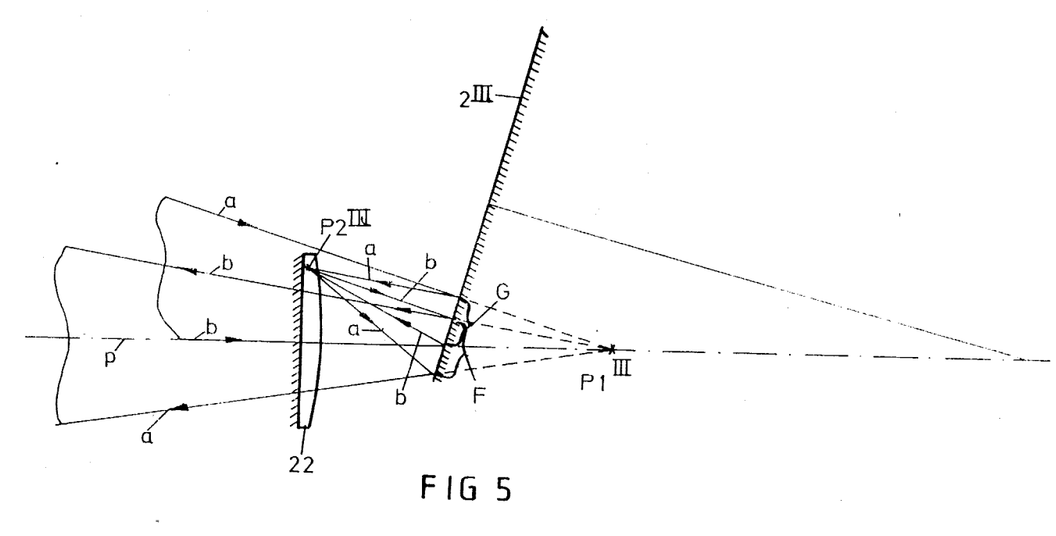
FIG. 5 is an enlarged view of a portion of the system of FIG. 4 and shows the reflections on the rotor facets which take place in the reflection area closest to the detector.

FIG. 5 is an enlarged view from the line I—I of FIG. 1 with the rotor in a different angular position than FIG. 4 and showing the beam reflections on the facet at F and G and on the reflective coating of the lens 22. To facilitate tracking of the beam path, the marginal rays of the beam are marked a and b.

The lens 22 is dimensioned such that, when viewed as in FIG. 5, the marginal ray b of the beam coming from the mirror $9^{III}$ is located as close as possible to the principal ray P of the beam to the detector $D^{III}$ at the ends of the scan, i.e., just before a change-over from one facet to another.

The rest of the components $9^{III}$, $11^{III}$, $12^{III}$ of the device shown in FIG. 4 have functions and dimensions analogous to those of the components 9, 11, 12 shown in FIGS. 1 and 2. The advantage of the embodiment shown in FIG. 4 over the one shown in FIGS. 1 and 2 is that the curved line scanned by the image $P4^{III}$ is longer in the embodiment shown in FIG. 4. Thus, this embodiments scans over a wider angle. The lens 22 functions as a very powerful field lens.

Figure 6:
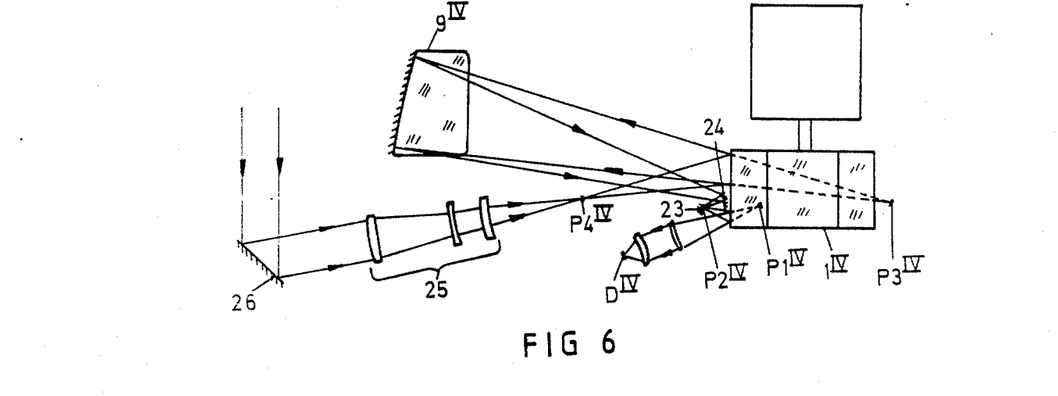
FIG. 6 is a side elevational view, partly in section, of a fourth embodiment.

FIG. 6 shows an embodiment in which the collimating optics of the system is a lens system 25. In this embodiment the field element is an approximately spherical mirror 23. A plane mirror 24 folds the beam path to deflect it to the approximately spherical mirror $9^{IV}$. As in the embodiment shown in FIG. 1 a stationary virtual image $P1^{IV}$ is located behind the facets. A real image $P2^{IV}$, which is a mirror image of the image $P1^{IV}$, moves along a curved line close to the mirror 23. In this embodiment it is practically impossible to avoid the curved line traversed by the image $P4^{IV}$ being convex to the rotor $1^{IV}$. Therefore, a lens system 25 is used as the objective of the scanning device. An oscillating mirror 26 is disposed where the beam path between the scanned object and the objective passes through a substantially stationary pupil during the scan. Instead of an oscillating mirror a multi-faceted rotor may be used to effect the vertical scanning.

It is generally desired to have as few refractive elements as possible in scanning systems, especially in scanning systems to be used for scanning radiation within the infrared wavelength region. This is so, partly because the material used in such elements is very expensive and partly because such elements require an anti-reflection coating. This embodiment shown in FIG. 6 has the disadvantage of having the curved line traversed by the image $P4^{IV}$ convex to the rotor so that an objective including a lens system has to be used.

Figure 7:
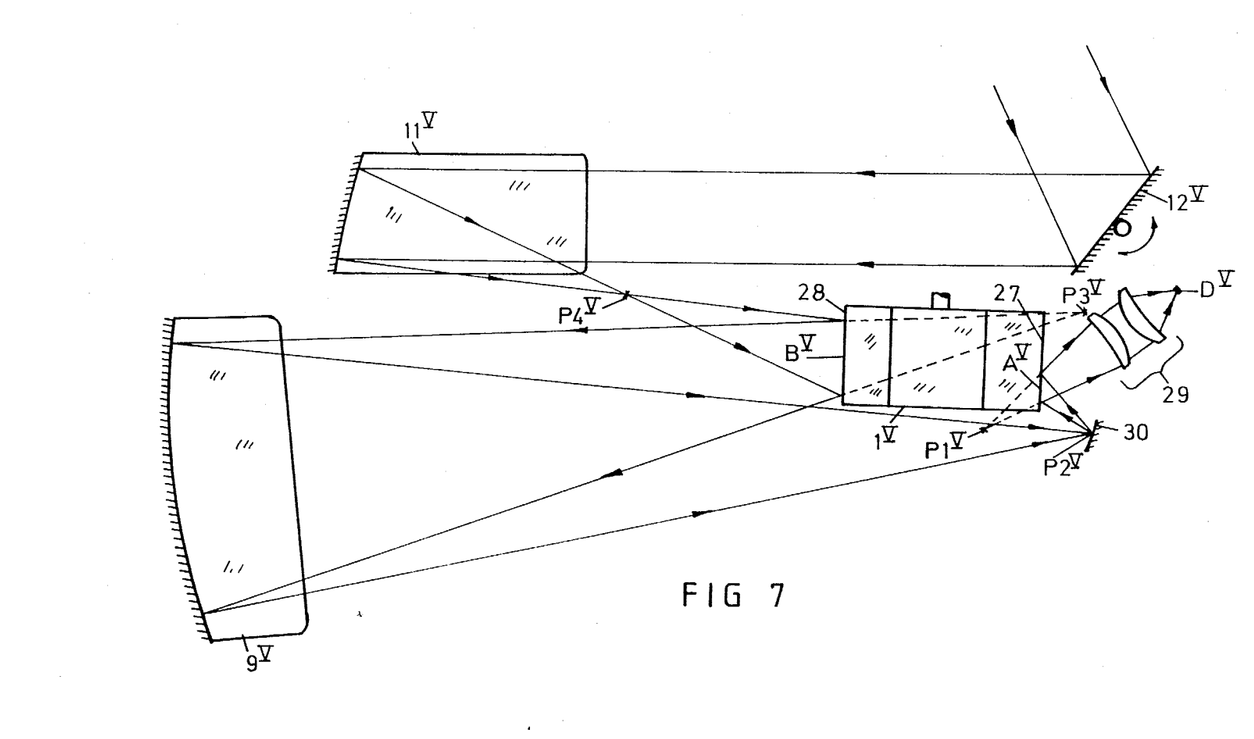
FIG. 7 is a side elevational view, partly in section, of a fifth embodiment.

This disadvantage is overcome in the embodiment shown in FIG. 7, in which the rotor $1^V$ has an even number of facets, the field element is a spherical mirror 30 and the two reflections $A^V$ and $B^V$ occur on two different facets 27 and 28 positioned on diametrically opposite sides of the rotor.

Thus, the detector $D^V$ with its optical relay system 29 is disposed on the opposite side of the rotor with respect to the approximately spherical mirrors $9^V$ and $11^V$. An image $P1^V$ of the detector is formed behind the facet 27. This image $P1^V$ is a virtual mirror image of a real image $P2^V$ which moves along a curved line. A field mirror 30 placed close to this line deflects the radiation cone without substantially changing its apex angle.

The mirror $9^V$ forms an image $P3^V$ of the image $P2^V$ behind the facet 28. Owing to reflection on the facet 28, the image $P3^V$ is a virtual mirror image of an image $P4^V$ which moves along a substantially circular arc as the rotor $1^V$ rotates. The circular arc is concave to the rotor and thus a substantially spherical mirror $11^V$ may be provided as an objective.

Figure 8:
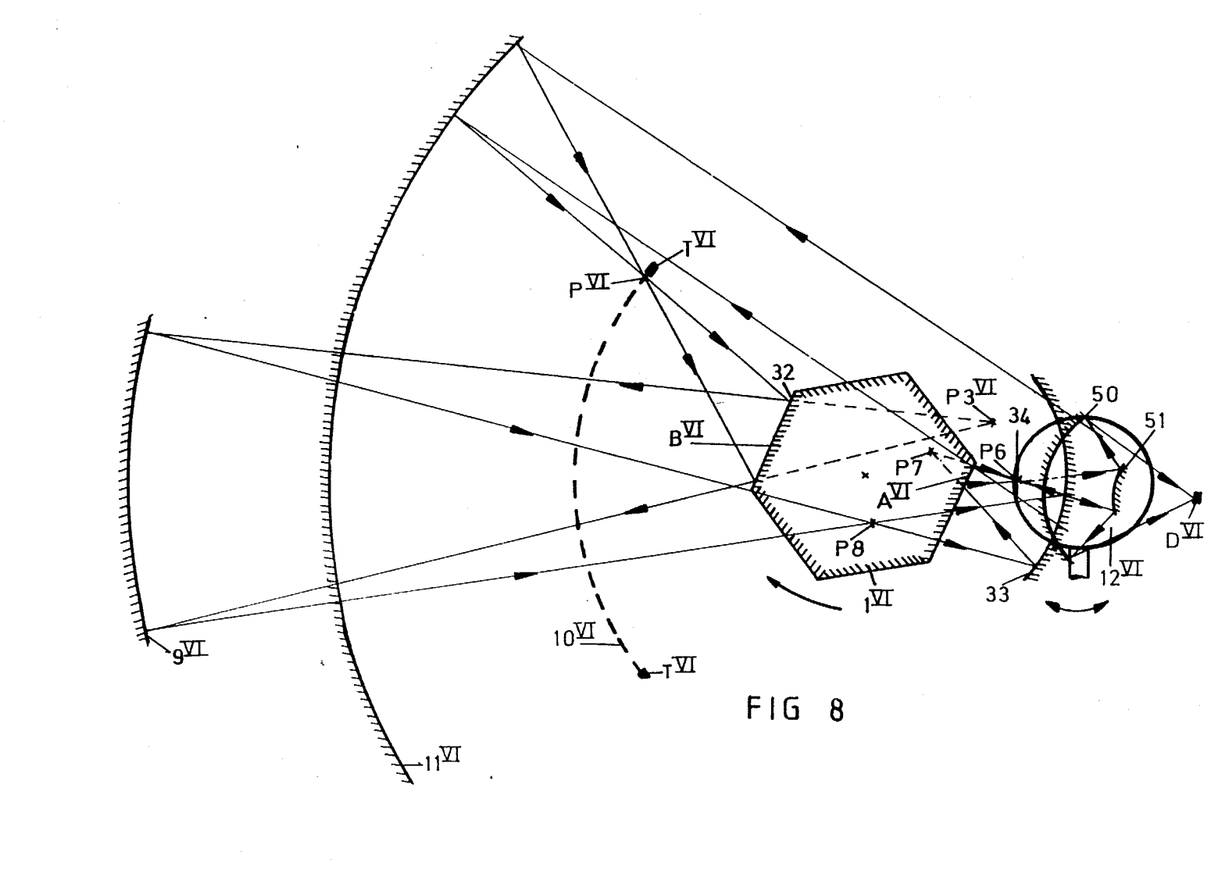
FIG. 8 is a plan view of a sixth embodiment.
Figure 9:
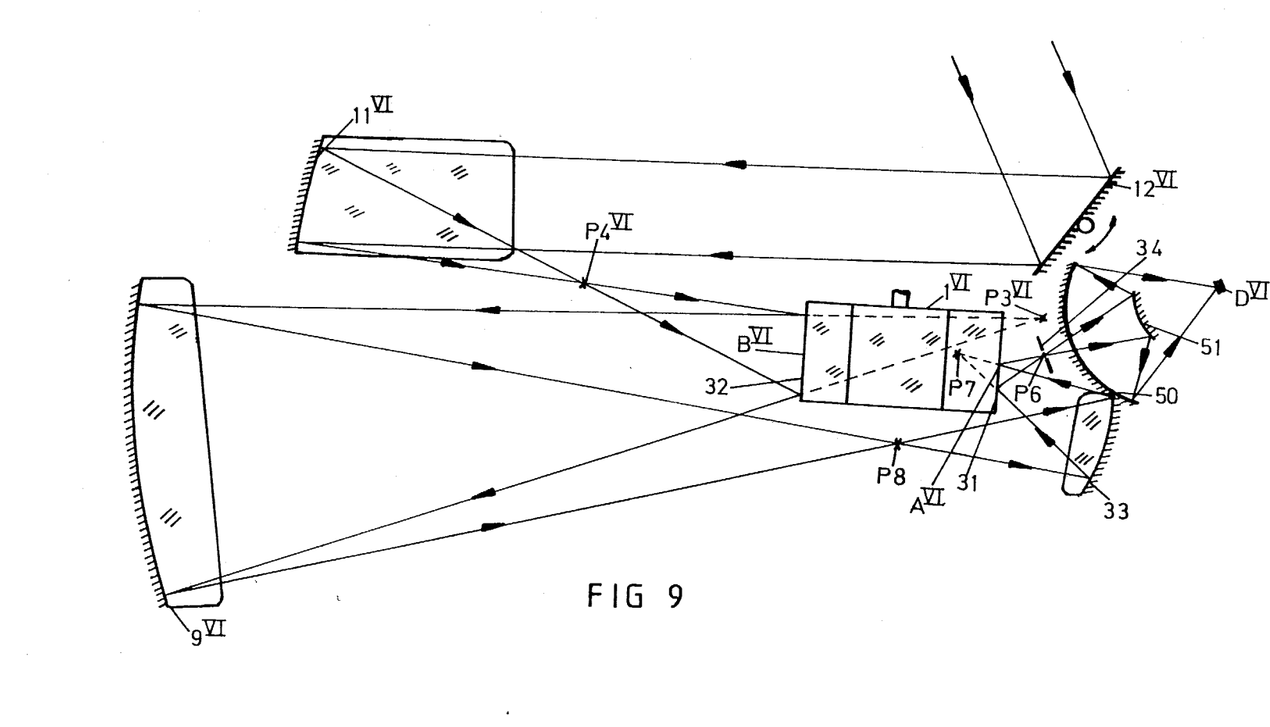
FIG. 9 is a side elevational view of the embodiment shown in FIG. 8.

FIGS. 8 and 9 show still another embodiment having only reflective optical elements in the scanning system. As in the embodiment according to FIG. 7 reflections at $A^{VI}$ and $B^{VI}$ on the rotor $1^{VI}$ occur on two diametrically opposite facets 31 and 32. An approximately spherical mirror 33 is placed on the same side of the rotor as the facet 31 and nearly at the same place as the mirror 30 in the device shown in FIG. 7. However, unlike the mirror 30, the mirror 33 is not a field mirror. Instead, in this embodiment a stationary image P6 of the detector $D^{VI}$ is formed in front of the facet 31. If desired, a field stop 34 may be disposed at this image P6 to reduce stray radiation which makes this embodiment the preferred one. The optical relay system associated with the detector $D^{VI}$ may be formed by two spherical mirrors 50 and 51 disposed like the mirrors in a so-called inverse Cassegrain system. In this way no refractive elements need be placed in the beam path to the detector $D^{VI}$ in the embodiment shown in FIG. 9.

A mirror image P7 of the stationary image P6 is formed behind the facet 31 and moves as the rotor $1^{VI}$ rotates. The mirror 33 forms an image P8 of the image P7 at a distance from the flat end face of the rotor $1^{VI}$ as is shown in FIG. 9. An image $P3^{VI}$ of the image P8 is formed behind the facet 32 by the substantially spherical mirror $9^{VI}$. This image $P3^{VI}$ is a mirror image of an image $P4^{VI}$, which during the rotation of the rotor moves along an arcuate line $10^{VI}$ concave to the rotor. Temperature references $T^{VI}$ are disposed at the ends of the arcuate line. A substantially spherical mirror $11^{VI}$ having the arcuate line placed as close to its focal surface as possible serves as an objective of the scanning device. Vertical scanning is effected by an oscillating mirror $12^{VI}$ or some other type of scanning element.

Figure 10:
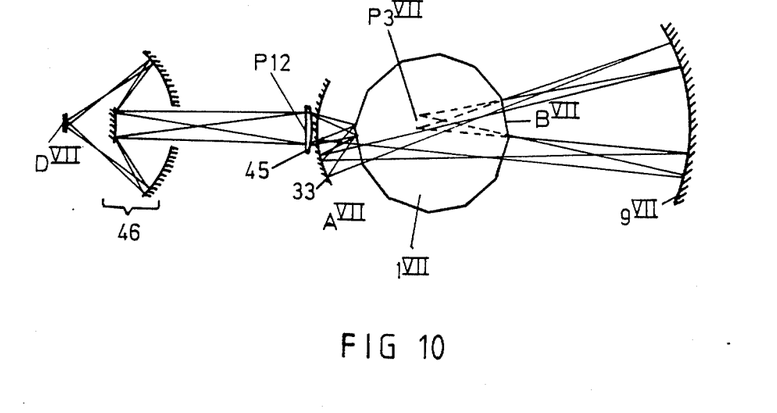
FIG. 10 is a plan view of a variant of the embodiment shown in FIGS. 8 and 9 having a detector array.

The detector $D^{VI}$ in FIG. 9 is shown to be a single detector. FIG. 10 shows an embodiment, in which a detector array $D^{VII}$ including several detector elements is used instead of this single detector. The detector array $D^{VII}$ is located so that the scene is scanned serially by the detector elements of the array and the signals from the detector elements are individually delayed to such an extent that at any given moment the sum of the delayed signals from all the elements jointly represent the detected radiation from a single spot of the scanned object. Instead of a detector array of discrete detectors of the type mentioned above, a continuous detector strip, a so-called Sprite®-detector, may be used. If a detector array or a Sprite®-detector is used, the field stop 34 in FIG. 9 should in this case have an elongated shape and a beam deflecting field element, such as a field lens 45 or a spherical field mirror, should be placed close to it. The focal distance of the field lens 45 (or of the field mirror) is selected such that an image of the aperture (the pupil) is formed on or near the rotor $1^{VII}$ at the facet reflection area $B^{VII}$. Then, the facet dimensions can be minimized. Another image of the aperture is formed on or near the rotor $1^{VII}$ at the facet reflection area $A^{VII}$. In this way a high scanning efficiency is achieved even with detector arrays having many detector elements.

Figure 11:
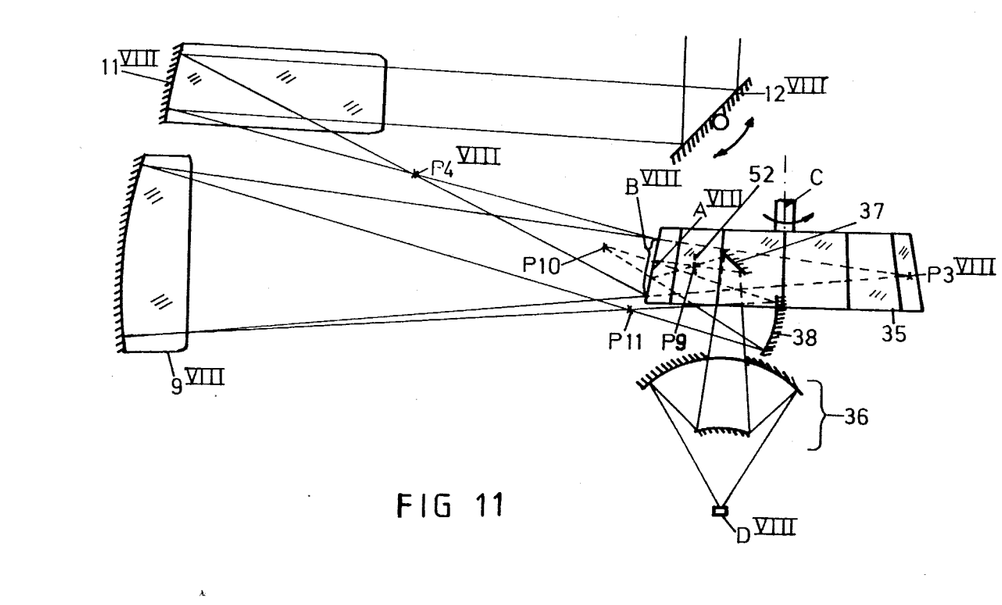
FIG. 11 is a side elevational view, partly in section, of a seventh embodiment.

FIG. 11 shows still another embodiment of the scanning system according to the invention. In this embodiment the multi-faceted rotor 35 is an annular structure having a thin wall and plane reflective facets both on its outer and its inner sides. As shown in FIG. 10 the facets are inclined to the axis of the rotor. Alternatively, the facets may be parallel to the axis. The rotor is rotated about its axis C by a motor (not shown).

A stationary real image P9 of the radiation detector $D^{VIII}$ is formed by an optical relay system 36, preferably of the same type as in the embodiment shown in FIG. 8, via a stationary, inclined plane mirror 37 located inside the rotor. A field stop 52 is disposed at P9. A mirror image P10 of the image P9 is located behind the facets within the rotor 35 and moves as the rotor rotates.

A substantially spherical mirror 38 is disposed axially outside the rotor near its axis. An image P11 of the image P10 is formed by the mirror 38, the light ray between the mirror 38 and the image P9 being reflected at $A^{VIII}$ on an inner facet of the rotor. An image $P3^{VIII}$ is formed behind an outer facet of the rotor 35 by a substantially spherical mirror $9^{VIII}$. Owing to reflection on an outer facet at $B^{VIII}$ the image $P3^{VIII}$ is a mirror image of an image $P4^{VIII}$ which moves along an arcuate line concave to the rotor 35 as the rotor rotates. A substantially spherical mirror $11^{VIII}$ having the arcuate line on its focal surface serves as an objective of the scanning device. An oscillating mirror $12^{VIII}$ effects the vertical scanning.

All the embodiments mentioned above are scanning systems adapted to scan the radiation emitted from a scene or an object. The radiation is transmitted to a detector. It is to be noted that all these embodiments can be modified to be picture generating systems. A rapidly varying, modulated light source, such as a light emitting diode or a laser, can then take the place of the detector. The light beam from the light source passes through the system in the direction opposite to that shown in the drawings, to impinge onto the eye of an observer or onto a screen.

Figure 12:
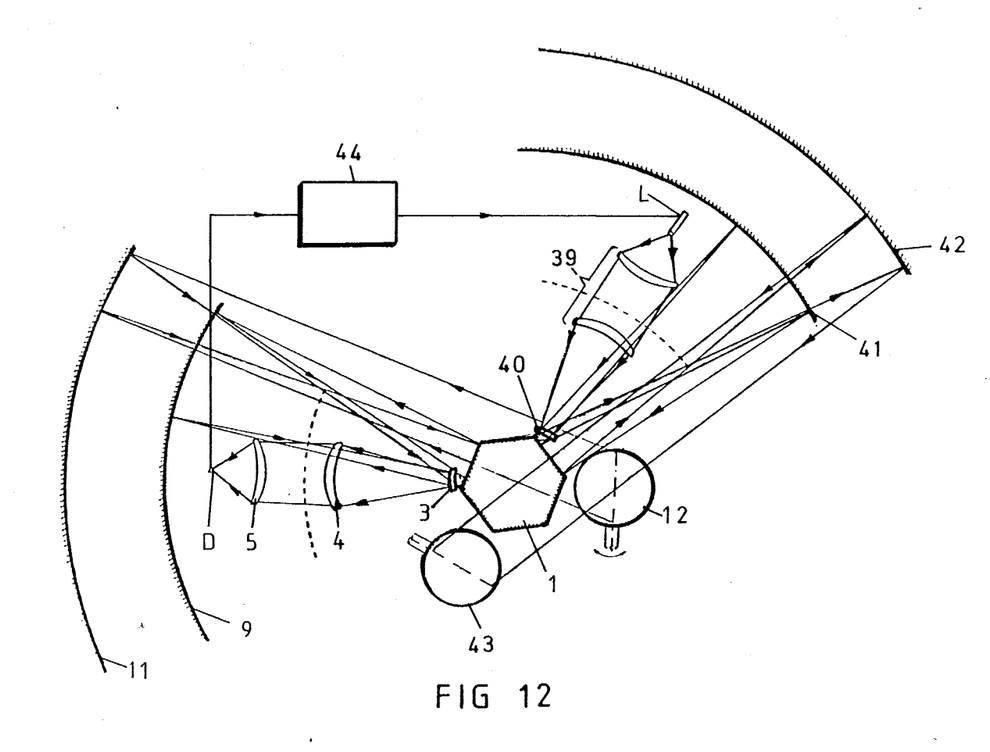
FIG. 12 is a plan view of an embodiment having a supplementary visual beam path to effect picture generation synchronously with the scanning of the object.

It it also possible to use the same rotor both for scanning the radiation emitted by an object and for generating a picture of the object. FIG. 12 shows an embodiment in which the scanning device comprising the elements D, 5, 4, 3, 1, 9, 11, 12 is supplemented by a picture generating device including a light emitting diode L, an optical relay system 39, the rotor 1, a lens 40, two approximately spherical mirrors 41 and 42 and an oscillating mirror 43. The eye of an observer looks into the mirror 43 or through an optical system having a pupil relatively near the mirror. In this case it may be necessary to focus the beam coming from the mirror 42. Focusing may be effected by moving the mirror 42 in the direction of the optical axes between the mirrors 42 and 43.

The video signal from the radiation detector D obtained during a scan is fed to the control input of the light emitting diode through an amplification and signal correction circuit 44. The modulated light from the light emitting diode is transmitted directly to the eye of the observer by the picture generating system 39 to 43. The observer sees a picture of the infrared radiation emitted from the scanning object.

In the embodiment shown in FIG. 12 only the multi-faceted rotor is common to the system for scanning the object and the system for generating the picture. It is obvious that both systems may also have the lens 3 and the mirrors 9, 11 and 12 in common. A first beam splitter (not shown) then is disposed between the lens 4 and the rotor 1 to pass infrared radiation to the detector D and to pass radiation from the light source into the system. A second beam splitter (not shown) is also placed outside the mirror 12 to pass infrared radiation from the object to the system and to pass the radiation from the light source L to the eye.

The radiation from a light emitting diode is not intensive enough to generate a distinct picture on a screen. If a distinct picture is desired, a more powerful light source must be used, such as a laser and a light modulator.

Many modifications may be made within the scope of the invention. In each one of the embodiments shown in the drawings several different features of the invention are shown. These features are not necessarily limited to the embodiments in which they are actually shown but may in most cases be embodied in the the other embodiments as well.

In a scanning system having the facet tracing features of the invention it is possible to improve the resolution of the system by providing curved facets on that area of the rotor where the reflection nearest to the collimating optics, i.e. to have each facet at that area (B) of reflection formed as a substantially spherical concave mirror. Such facets would have for result that the image P4 of the detector would be smaller and moved closer to the rotor 1. The moving of the image closer to the rotor would mean a shortening of the length of the arcuate line along which the image P4 moves, but the reduction of the size of the detector image would dominate over the reduction of the length of the arcuate line. On balance, therefore, the number of detector elements imaged on the line would be increased if the facets were curved at the reflection area B. Instead of by curved facets the same result may be accomplished by positive lenses disposed in front of each facet and rotating with the rotor.

I claim:

1. A scanning system for optical scanning of a scene in at least one dimension, including a multi-faceted reflective scanning rotor, optical beam converging means disposed in the beam path between the scene and the rotor for forming a primary image of the scene between the beam converging means and the rotor, a first substantially spherical mirror disposed in the beam path of the system between first and second areas of reflection on the rotor, both areas being disposed in a non-collimated beam path, a radiation detecting or emitting means disposed at the end of the beam path in the system, a beam converging optical element disposed in the beam path between the first substantially spherical mirror and the second area of reflection, and means for forming a real image of the radiation detecting or emitting means in the beam path at a position between the first substantially spherical mirror and a location so close to the beam converging optical element that the element serves as a field element for said location of said real image.

2. A scanning system according to claim 1, in which the beam converging optical element comprises a field lens, the side of said field lens facing away from the rotor having a reflective coating, and the beam path comprises a third area of reflection on the rotor between the field lens and the first mirror.

3. A scanning system according to claim 1, in which the beam converging optical element comprises a field mirror and in which the first area of reflection and the second area of reflection are on two diametrically opposite facets of the rotor.

4. A scanning system according to claim 1, wherein the beam converging optical element is disposed for forming said real image of a stationary image, said stationary image and said beam converging optical element being disposed in the beam path on opposite sides of the second area of reflection on the rotor.

5. A scanning system according to claim 4, in which said radiation detecting or emitting means comprises an elongated array of a plurality of detector elements serially receptive of the scanning beam, in which a field stop of elongated shape is disposed at said stationary image and in which a further beam converging field element is disposed adjacent the field stop.

6. A scanning system according to claim 4, wherein the rotor is annular and has reflecting facets both on the inner and the outer sides, and wherein the first area of reflection and the second area of reflection are on an outer and an inner facet, respectively.

7. A scanning system according to claim 1, wherein the beam has a cross section at the first area of reflection on the rotor extending over practically the extension of one of the facets along the periphery of the rotor, and wherein an image is located behind said facets, which image due to the reflection on said first area of reflection is a virtual mirror image of the primary image, and that the primary image traverses a second curved line as the rotor rotates.

8. A scanning system according to claim 7, wherein at least one temperature reference is located on the second curved line.

9. A scanning system according to claim 7, wherein the optical beam converging means is a substantially spherical mirror having the second curved line as close as possible located in its focal surface.

10. A scanning system according to claim 7, wherein the optical beam converging means comprises a lens system having the second curved line as close as possible located in its focal surface.

11. A scanning system according to claim 9 wherein a second scanning element for scanning in another direction than the multi-faceted rotor is located where the beam path during a scanning made by said rotor passed through a substantially stationary pupil.

12. A scanning system according to claim 1, wherein the facets on the rotor are concave at the first area of reflection.

13. A scanning system according to claim 1, wherein two mirrors are inserted in the beams path between the rotor and the first substantially spherical mirror to lengthen the beam path by folding it.

14. A scanning system according to claim 1, wherein at least one of the stationary, substantially spherical mirrors included in the system comprises a toroidal or an elipsoidal mirror.

15. A scanning system according to claim 1, comprising a system for detecting radiation emitted from an object, wherein the radiation responsive or emitting means comprises a radiation detector and the beam path through the system is directed from the scene to the detector, and a system for picture generation, wherein the radiation detecting or emitting means comprises a modulated light source, and the beam path through the system is directed from the light source to the scene, the system for detecting radiation and the system for picture generation including the same multifaceted rotor.

16. A scanning system according to claim 1 wherein said beam converging optical element comprises a positive lens or a substantially spherical mirror.

17. A scanning system according to claim 5 wherein said further beam converging field element comprises a field lens or a field mirror.

18. A scanning system according to claim 15 wherein said modulated light source comprises a light emitting diode or a laser.

* * * * *